United States Patent [19]

Johnson et al.

[11] Patent Number: 5,064,626

[45] Date of Patent: Nov. 12, 1991

[54] TRIALKYL ARSINE SORBENTS

[75] Inventors: Marvin M. Johnson; Patricia A. Tooley; Gary A. Delzer; Gerhard P. Nowack; Ted H. Cymbaluk; all of Bartlesville, Okla.

[73] Assignee: Phillips Petroleum Company, Bartlesville, Okla.

[21] Appl. No.: 619,355

[22] Filed: Nov. 28, 1990

[51] Int. Cl.$^5$ .................. B01D 53/04; C07C 7/12; C01G 28/00
[52] U.S. Cl. .................. 423/245.1; 423/210; 585/820; 585/823
[58] Field of Search ............ 423/245.1, 210, 562, 423/561.1; 556/64; 208/293, 295, 251 R, 253; 585/820; 55/72

[56] References Cited

U.S. PATENT DOCUMENTS

| | | | |
|---|---|---|---|
| 3,804,750 | 4/1974 | Myers et al. | 208/253 |
| 3,876,533 | 4/1975 | Myers | 208/251 H |
| 3,933,624 | 1/1976 | Myers | 208/253 |
| 4,046,674 | 9/1977 | Young | 208/251 H |
| 4,083,924 | 4/1978 | Styring | 208/253 |
| 4,446,006 | 5/1984 | Albertson | 208/253 |
| 4,474,896 | 10/1984 | Chao | 502/216 |
| 4,541,918 | 9/1985 | Stapp | 208/87 |
| 4,593,148 | 6/1986 | Johnson et al. | 585/823 |
| 4,839,029 | 6/1989 | Ichikawa et al. | 208/251 H |
| 4,853,110 | 8/1989 | Singhal | 208/251 H |
| 4,933,159 | 6/1990 | Nowack et al. | 423/245.1 |

FOREIGN PATENT DOCUMENTS 60-68034 9/1983 Japan .

OTHER PUBLICATIONS

Grant and Hackh, "Chemical Dictionary", 5th Ed., (1987) pp. 257 and 383.
Zingaro et al., "Group V Oxides and Calcogenides: ...", Inorganic Chemistry, vol. 1, 1962, pp. 771–774.
Farlow et al., "1-Thiosorbitol", Journal of the American Chemical Society, vol. 70, 1948, pp. 1392 and 1393.

*Primary Examiner*—Michael L. Lewis
*Assistant Examiner*—Peter T. DiMauro
*Attorney, Agent, or Firm*—K. K. Brandes

[57] ABSTRACT

Trialkyl arsine (in particular trimethyl arsine) is removed from a fluid (e.g. a hydrocarbon-containing gas) by contacting the fluid with a sorbent material comprising (a) a transition metal polysulfide (preferably $Fe_2(S_3)_3$, and (b) an inorganic support material (preferably alumina).

20 Claims, No Drawings

TRIALKYL ARSINE SORBENTS

BACKGROUND OF THE INVENTION

This invention relates to the removal of trialkyl arsines from fluids by means of solid sorbents. In another aspect, this invention relates to the removal of trialkyl arsines from gases, in particular hydrocarbon-containing gases.

Materials for adsorbing and/or absorbing unsubstituted arsine ($AsH_3$) are well known. However, many of these materials are ineffective for the sorption of trialkyl arsines, which may be present as undesirable impurities in natural gas streams produced at some well sites. The present invention provides a sorbent material which is effective for removing trialkyl arsines from fluids by sorption (i.e., adsorption and/or absorption).

SUMMARY OF THE INVENTION

It is an object of this invention to provide a process for removing trialkyl arsines from fluids. It is another object of this invention to provide a process for removing trialkyl arsines from gases, in particular hydrocarbon-containing gases. Other objects will become apparent from the detailed description of the invention and the appended claims.

In accordance with this invention, a process for at least partially removing trialkyl arsines from fluids (preferably gases) comprises the step of contacting a fluid feed which contains at least one trialkyl arsine with a solid sorbent material comprising (preferably consisting essentially of) (a) at least one sulfide of iron or polysulfide of iron or mixtures thereof, and (b) an inorganic support material (preferably selected from the group consisting of alumina, fluorided alumina, aluminum phosphate, magnesia, silica, aluminosilicates (such as clays and zeolites), titania, zirconia, hafnia, zinc oxide, zinc aluminate, aluminates of metals of Group IIA of the Periodic Table [as defined on page 852 of Webster's New Collegiate Dictionary, 1977], zinc titanate, titanates of Group IIA metals, activated carbon, and mixtures of the above materials); wherein said contacting is carried out at such contacting conditions as to obtain a fluid product having a lower trialkyl arsine content than said feed (with the spent sorbent material containing the portion of trialkyl arsine which has been removed from the feed). Preferably, component (a) is FeS or at least one Fe (III) polysulfide, and component (b) is alumina.

DETAILED DESCRIPTION OF THE INVENTION

The term "trialkyl arsine", as used herein, refers to compounds having the general chemical formula of $R_3As$, wherein each R is a radical independently selected from among alkyl groups (straight and/or branched), preferably having 1–6 (more preferably 1–3) carbon atoms. Particularly preferred trialkyl arsines are trimethyl arsine, triethyl arsine, dimethyl ethyl arsine and diethyl methyl arsine.

Any suitable liquid or gaseous fluid stream which contains trialkyl arsine(s) can be used as feed in the process of this invention. Preferably, the feed is gaseous. Non-limiting examples of suitable feeds are: natural gas; gaseous petroleum fractions comprising paraffins and olefins containing 1–6 carbon atoms per molecule; and gaseous products from thermal and catalytic cracking of petroleum, shale oil or coal. Generally, the gases comprise methane, ethane, ethylene, propane, propylene, n-butane, isobutane, butenes; and the like. These gas streams can contain other impurities, such as hydrogen sulfide, carbonyl sulfide (COS), mercaptans, organic sulfides, mercury and/or compounds thereof, carbon monoxide, carbon dioxide, inert gases ($N_2$, He, Ne, Ar), and the like.

Other arsenic compounds may also be present in the fluid stream which is treated by the process of this invention, such as $AsH_3$, $RAsH_2$, $R_2AsH$, and the like, wherein R is an alkyl group, as defined above. It is also possible to have triphenyl arsine, dialkyl phenyl arsines, dialkyl cycloalkyl arsines, and the like present in the feed. Preferably, free oxygen is substantially absent from the feed.

Generally, the total concentration of the trialkyl arsine(s) in the feed (preferably gaseous) is in the range of from about 1 ppb As (1 part by weight arsenic per billion parts by weight of feed) to about 0.1 weight-% As, preferably about 0.01–10 ppm As (0.01–10 parts by weight arsenic per million parts by weight of feed). The concentrations of the other impurities and the exact composition of the feed will widely vary from feedstock to feedstock.

The sorbent materials which are used in the sorption process of this invention comprise (a) at least one iron sulfide or iron polysulfide or mixtures of these sulfur compounds of iron (which can have the valence state of +2 or +3) and (b) a suitable inorganic support (carrier) material. The iron sulfide(s) and/or iron polysulfide(s) can be any binary Fe-S compound having the general chemical formula of $Fe_xS_y$, wherein x can be 1 or 2, and y can range from 1 to about 20. Particularly preferred are FeS and an Fe(III) polysulfide having an atomic ratio of Fe:S of about 2:9. The level of the iron sulfide(s) and/or polysulfide(s) in the sorbent materials is such that the weight percentage of bound sulfur is in the range of from about 1 to about 25 weight-% S (preferably about 2–10 weight-% S).

Preferably, component (a) of the sorbent material consists essentially of one of the above-described iron sulfides or polysulfides or mixtures of two or more of these iron sulfides and/or iron polysulfides. However, it is within the scope of the invention to have small amounts (generally less than about 1 weight percent) of impurities present, such as oxides, sulfites and sulfates of iron and elemental sulfur. These additional substances are generally formed by inadvertent oxidative conversion of iron sulfide(s) or polysulfide(s) during exposure to a free oxygen containing gas, in particular air. In order to minimize the presence of the above-described additional substances, the sorbent materials of this invention are preferably prepared, dried, stored and handled in an inert gas atmosphere, such as $N_2$, He and the like.

Any suitable, effective inorganic support material can be employed as component (b). Preferably, the support material is selected from the group consisting of alumina, fluorided alumina (i.e., alumina which has been treated with HF or $NH_4HF_2$ under such conditions as to incorporate fluoride ions into the crystal lattice of alumina), aluminum phosphate, magnesia (MgO), silica, titania ($TiO_2$), zirconia ($ZrO_2$), hafnia ($HfO_2$), zinc oxide, zinc aluminate ($ZnAl_2O_4$) aluminates of Group IIA metals (i.e., of Be, Mg, Ca, Sr, Ba), zinc titanate ($Zn_2TiO_4$), titanates of Group IIA metals, activated carbon, and mixtures of two or more than two of the above materials. The presently more preferred support material is alumina.

Component (a) and (b) can be combined in any suitable manner, substantially in the absence of free oxygen. In a presently more preferred method, the support material (b) is impregnated with a solution (preferably aqueous) of an iron compound (preferably $FeSO_4$ or $FeCl_3$). The obtained impregnated material is dried in a nitrogen atmosphere, and then impregnated with a solution (preferably aqueous) of an ammonium sulfide or polysulfide or alkali metal sulfide or polysulfide (preferably $Na_2S$ or $Na_2S_3$). The twice impregnated material is dried in a nitrogen atmosphere. An alternative method comprises impregnating the support material first with ammonium sulfide or polysulfide or alkali metal sulfide or polysulfide, followed by drying under $N_2$, impregnating the dried material with an iron compound, and drying again under $N_2$.

A further alternative method comprises first preparing iron sulfide or iron polysulfide by reaction of a dissolved iron compound with a solution of an ammonium or alkali metal sulfide or an ammonium or alkali metal polysulfide. Preferably, iron (III) polysulfide is prepared by reaction with $Na_2S_3$, substantially in accordance with the general procedure described in the Journal of the American Chemical Society 70, 1948, page 1393, left column. The formed precipitate of iron sulfide and/or polysulfide is recovered by filtration (preferably in a nitrogen atmosphere). Then the iron sulfide and/or polysulfide is slurried in a liquid (preferably water), and the iron sulfide and/or polysulfide slurry is mixed with the support material (preferably under $N_2$). Excess liquid is removed (e.g., by vacuum filtration), and the sorbent material is dried (preferably in a nitrogen atmosphere).

The sorbent particles of this invention can have any suitable surface area (preferably about 10–1000 $m^2/g$, as measured by the B.E.T. method employing $N_2$), any suitable shape (such as spherical, cylindrical, ring-shaped, trilobal etc.), and any suitable size (such as about 0.2–20 mm diameter for spherical particles).

Any suitable contacting conditions can be employed in the sorption process of this invention. Generally, the temperature in the contacting zone is in the range of from about $-20°$ to about $100°$ C., preferably about $20°$ to about $50°$ C. Generally, the pressure in the contacting zone is in the range of from about 1 to about 500 atm., preferably about 1 to about 70 atm. Generally, the gas hourly space velocity of the gaseous feed in the contacting zone is in the range of from about 10 to about 20,000 volume of feed/volume of sorbent/hour, preferably about 1,000 to about 10,000 volume/volume/hour, measured at about $25°$ C./1 atm. Generally, the contacting is continued until trialkyl arsine breakthrough occurs, i.e., when the treated product contains more trialkyl arsines than can be tolerated, such as about 50 ppb.

Treatment of the feed streams in accordance with the process of this invention can be carried out in any suitable manner. For example, in a preferred embodiment a bed of the sorbent is placed as a fixed bed in a confined zone, and a fluid stream (preferably a gas) is passed therethrough in either upward or downward flow. Other suitable, yet less preferred methods of treatment can include a fluidized operation in which the feed and the sorbent particles are maintained in a state of turbulence under hindered settling conditions in a confined zone, moving bed operations in which the sorbent passes as a moving bed countercurrently to or concurrently with the feed, etc. In a fixed bed operation of a continuous process, the flow of fluid can be rotated between two or more sorbent beds with at least one being in regular operation, the other being in a regeneration mode. Continuous processes are preferred, but it is understood that batch type operations can be employed when desired.

It is within the scope of this invention to employ a combination of sorbents, such as a first bed (guard bed) of a supported CuO-ZnO material (described in U.S. Pat. No. 4,593,148) or $PbO/Al_2O_3$ for substantial removal of $AsH_3$ and/or $H_2S$ from the feed, and at least one subsequent downstream bed containing the sorbent material of this invention for absorbing trialkyl arsines. This multi-bed operation can be carried out in one reactor containing a layer of the supported CuO-ZnO material or $PbO/Al_2O_3$ (or any other known sorbent for $AsH_3$ and $H_2S$) and a downstream layer of a trialkyl arsine sorbent of this invention. Or the multi-bed operation can be carried out using two (or more) separate sorption reactors: a first reactor containing the supported CuO-ZnO material or $PbO/Al_2O_3$ (or any other known sorbent for $AsH_3$ and $H_2S$) and a second reactor containing the trialkyl arsine sorbent of this invention, wherein the feed passes through the first reactor and thereafter through the second reactor.

The process of this invention will be further illustrated by the following non-limiting examples.

EXAMPLE I

This example illustrates the preparation of a preferred sorbent material and the experimental setup for investigating the sorption of trimethyl arsine (TMA) by this sorbent material.

A sorbent material comprising FeS on alumina was prepared as follows. 20 cc of an aqueous 0.5 molar solution of $FeSO_4$ was used to impregnate 24 grams of alumina extrudates (provided by Engelhard Corporation, Edison, N.J., under the product designation "Harshaw Al-3996-R"). The thus impregnated alumina particles were dried at $150°$ C. under a nitrogen atmosphere. 20 cc of an aqueous 0.5 molar solution of $Na_2S$ was poured onto the dried $FeSO_4$-impregnated alumina particles. The twice impregnated alumina particles were again dried at about $150°$ C. under a nitrogen atmosphere. The dry black sorbent material was ground and sieved. A 20–40 mesh fraction was tested for trimethyl arsine sorption by the method described below.

A nitrogen gas stream was passed through a flask containing liquid trimethyl arsine (provided by Strem Chemicals, Inc.), which was cooled to about $-78°$ C. by placing the flask in a dry ice/acetone mixture. The exiting gas stream, which contained $N_2$ and trimethyl arsine, was passed through a glass tube of about 7 mm diameter and about 12 cm length containing about 1 gram of the sorbent material. The gas which exited from the absorption tube was passed through an aqueous solution of $KMnO_4$ and then to a flow meter. The flow rate of the gas was about 1800 cc/hour (equivalent to about 360 cc/cc sorbent/hour).

When trimethyl arsine breakthrough occurred (i.e., when the sorbent had reached its maximum arsine absorption capacity), the purple color of the $KMnO_4$ solution turned brownish. After arsine breakthrough had been detected, the flow of the trimethyl arsine containing gas stream was stopped, and a purge stream of pure nitrogen was passed through the sorbent material for about 15 hours so as to purge unabsorbed trimethyl arsine therefrom. The sorption tube containing the sorbent and adsorbed/absorbed trimethyl arsine was weighed. The difference between this weight and the initial weight of the tube with fresh sorbent was the weight of adsorbed and/or absorbed trimethyl arsine.

The $FeS/Al_2O_3$ sorbent material had picked up about 0.01 grams of trimethyl arsine per gram sorbent, which was equivalent to about 0.7 weight-% absorbed As. In a second test run using the $FeS/Al_2O_3$ sorbent material, 0.8 weight-% As was adsorbed and/or absorbed.

EXAMPLE II

This example illustrates the adsorption of trimethyl arsine (TMA) by an Fe(III) polysulfide, which was prepared substantially in accordance with the procedure described in the Journal of the American Chemical Society 70, 1948, page 1393, left column, except that $FeCl_3$ was used in lieu of $CoCl_2$. An aqueous solution of $FeCl_3$ was mixed with an equimolar amount of an aqueous solution of $Na_2S_3$ (prepared by mixing 1 mole of dissolved $Na_2S$ with 2 g-equivalents of sulfur). The formed precipitate was separated from the solution by filtration, washed three times with water and dried under a nitrogen atmosphere.

Sample surfaces of the obtained black material, which is believed to have consisted essentially of $Fe_2(S_3)_3$, was examined by X-ray photoelectron spectroscopy (XPS) analysis (employing a PHI-550 DSCA/Auger spectrometer equipped with an aluminum X-ray source) before and after exposure to trimethyl arsine. The adsorption of TMA by the sorbent material was carried out in a reaction chamber attached to the analysis chamber. The reaction chamber containing the sorbent sample was first evacuated to a pressure below $5 \times 10^{-6}$ torr. Then the sample was exposed to a flow of nitrogen containing 0.066% TMA for 15-20 minutes at room temperature. The pressure in the reaction chamber was maintained at about 800 torr. After exposure, the reaction chamber was immediately evacuated and the sample was transferred directly into the analysis chamber for examination. The spectrometer was operated at a pass energy of 25 eV. Evaluation of XPS peaks and their intensities revealed that trimethyl arsine had been essentially physically adsorbed by the $Fe_2(S_3)_3$ on alumina sorbent material, and that the molar ratio of adsorbed trimethyl arsine to $Fe_2(S_3)_3$ on the sorbent surface was about 0.2:1. Based on these test results, it is concluded that supported iron polysulfides will also adsorb trialkyl arsines.

Reasonable variations and modifications which will be apparent to those skilled in the art, can be made within the scope of the disclosure and appended claims without departing from the scope of this invention.

That which is claimed is:

1. A process for at least partially removing trialkyl arsines from fluids comprising the step of contacting a fluid feed which contains at least one trialkyl arsine with a solid sorbent material comprising (a) at least one iron polysulfide and (b) an inorganic support material; wherein said contacting is carried out at such contacting conditions as to obtain a fluid product having a lower trialkyl arsine content than said feed; wherein free oxygen is substantially absent from said feed; and wherein said solid sorbent material has been prepared in the substantial absence of free oxygen so as to substantially exclude elemental sulfur from said solid sorbent material.

2. A process in accordance with claim 1, wherein said fluid feed is a gas.

3. A process in accordance with claim 1, wherein said fluid feed is a hydrocarbon-containing gas.

4. A process in accordance with claim 1, wherein said trialkyl arsine has the chemical formula of $R_3As$ with each R being independently selected from the group consisting of alkyl groups containing 1-6 carbon atoms.

5. A process in accordance with claim 4, wherein said alkyl groups contain 1-3 carbon atoms.

6. A process in accordance with claim 1, wherein said fluid feed is a gas and said at least one trialkyl arsine is selected from the group consisting of trimethyl arsine, triethyl arsine, dimethyl ethyl arsine and diethyl methyl arsine.

7. A process in accordance with claim 1, wherein said fluid feed contains about 1 ppb to about 0.1 weight-% As.

8. A process in accordance with claim 1, wherein the level of said at least one iron polysulfide in said solid sorbent material is such as to provide a weight percentage of bound sulfur in the range of about 1 to about 25 weight-% S.

9. A process in accordance with claim 1, wherein component (b) of said solid sorbent material is selected from the group consisting of alumina, fluorided alumina, aluminum phosphate, magnesia, silica, aluminosilicates, titania, zirconia, hafnia, zinc oxide, zinc aluminate, aluminates of Group IIA metals, zinc titanate, titanates of Group IIA metals, activated carbon, and mixtures thereof.

10. A process in accordance with claim 1, wherein component (b) of said solid sorbent material is alumina.

11. A process in accordance with claim 1, wherein component (a) of said solid sorbent material consists essentially of at least one Fe(III) polysulfide.

12. A process in accordance with claim 1, wherein component (a) of said solid sorbent material is $Fe_2(S_3)_3$ and component (b) of said solid sorbent material is alumina.

13. A process in accordance with claim 1, wherein said solid sorbent material has been prepared by a method which comprises impregnating said inorganic support material with a solution of an iron(III) compound and with a solution of at least one polysulfide compound selected from the group consisting of ammonium polysulfides and alkali metal polysulfides, and drying the thus-impregnated inorganic support material, in the substantial absence of free oxygen.

14. A process in accordance with claim 13, wherein said inorganic support material is selected from the group consisting of alumina, fluorided alumina, aluminum phosphate, magnesia, silica, aluminosilicates, titania, zirconia, hafnia, zinc oxide, zinc aluminate, aluminates of Group IIA metals, zinc titanate, titanates of Group IIA metals, activated carbon, and mixtures thereof.

15. A process in accordance with claim 13, wherein said solid sorbent material is alumina and said at least one polysulfide compound is at least one alkali metal polysulfide.

16. A process in accordance with claim 15, wherein said inorganic support material is alumina, said iron(III) compound is $FeCl_3$, said at least one polysulfide compound is $Na_2S_3$.

17. A process in accordance with claim 1, wherein said solid sorbent material has been prepared by a method which comprises forming a slurry of at least one iron(III) polysulfide in a liquid, mixing said slurry with said inorganic support material, and drying the thus-obtained mixture, in the substantial absence of free oxygen.

18. A process in accordance with claim 17, wherein said inorganic support material is selected from the group consisting of alumina, fluorided alumina, aluminum phosphate, magnesia, silica, aluminosilicates, titania, zirconia, hafnia, zinc oxide, zinc aluminate, aluminates of Group IIA metals, zinc titanate, titanates of Group IIA metals, activated carbon, and mixtures thereof.

19. A process in accordance with claim 17, wherein said at least one iron(III) polysulfide is $Fe_2(S_3)_3$, said liquid is water, and said inorganic support material is alumina.

20. A process in accordance with claim 1, wherein said contacting is carried out at a temperature in the range of from about $-20°$ C. to about $100°$ C.

* * * * *